(12) United States Patent
Wurmfeld et al.

(10) Patent No.: US 10,706,396 B2
(45) Date of Patent: Jul. 7, 2020

(54) SYSTEMS AND METHODS FOR TRANSLATING A GESTURE TO INITIATE A FINANCIAL TRANSACTION

(71) Applicant: Capital One Services, LLC, McLean, VA (US)

(72) Inventors: David K. Wurmfeld, Falls Church, VA (US); Tyler Sylvain Locke, Washington, DC (US); Adam Koeppel, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/925,153

(22) Filed: Mar. 19, 2018

(65) Prior Publication Data

US 2019/0287083 A1 Sep. 19, 2019

(51) Int. Cl.
*G06Q 20/10* (2012.01)
*G06F 3/01* (2006.01)
(Continued)

(52) U.S. Cl.
CPC ........... *G06Q 20/102* (2013.01); *G06F 3/017* (2013.01); *G06Q 20/3224* (2013.01); *G06Q 20/3278* (2013.01); *G06Q 20/401* (2013.01)

(58) Field of Classification Search
CPC .................................................... G06Q 20/102
(Continued)

(56) References Cited

U.S. PATENT DOCUMENTS 9,993,166 B1 * 6/2018 Johnson ................ A61B 5/0205
2012/0007713 A1 * 1/2012 Nasiri .................... G06F 1/1694
340/5.81
(Continued)

FOREIGN PATENT DOCUMENTS

EP 2813921 A1 12/2014
EP 2980741 A1 2/2016
(Continued)

OTHER PUBLICATIONS

"Human computer interaction using hand gestures," by Prashan Premaratne. Singapore: Springer, 2014. (Abstract only) (Year: 2014).*
(Continued)

*Primary Examiner* — Sara C Hamilton
(74) *Attorney, Agent, or Firm* — Troutman Sanders LLP; Christopher J. Forstner; John A. Morrissett

(57) ABSTRACT

Systems and methods for initiating and/or facilitating a financial transaction in response to detecting and translating a spatial gesture may be provided. A payor transaction device may be capable of detecting, via a motion-detecting device, a payor spatial gesture corresponding to a payment gesture of one or more predetermined spatial gestures and, responsive to detecting the payor spatial gesture, receiving payee account information from a payee transaction device. The payor transaction device may also be capable of transmitting, to a payor computing device, transaction data comprising the payee account information and data indicative of the payor spatial gesture. The payor computing device may be capable of transmitting at least a portion of the transaction data to a financial service provider terminal to enable the financial service provider terminal to facilitate the requested transaction.

14 Claims, 8 Drawing Sheets

(51) Int. Cl.
*G06Q 20/32* (2012.01)
*G06Q 20/40* (2012.01)

(58) Field of Classification Search
USPC .......................................................... 705/35
See application file for complete search history.

(56) References Cited

U.S. PATENT DOCUMENTS

| | | | | |
|---|---|---|---|---|
| 2013/0346168 | A1* | 12/2013 | Zhou | G06F 1/163 |
| | | | | 705/14.4 |
| 2014/0139422 | A1* | 5/2014 | Mistry | G06F 3/014 |
| | | | | 345/156 |
| 2014/0139454 | A1* | 5/2014 | Mistry | G06F 3/041 |
| | | | | 345/173 |
| 2014/0214597 | A1* | 7/2014 | Argue | G06Q 30/0633 |
| | | | | 705/26.8 |
| 2015/0055821 | A1* | 2/2015 | Fotland | G06K 9/3241 |
| | | | | 382/103 |
| 2015/0062089 | A1* | 3/2015 | Howard | G06F 1/1605 |
| | | | | 345/175 |
| 2015/0067824 | A1* | 3/2015 | Chatterton | G06F 3/0486 |
| | | | | 726/19 |
| 2015/0127541 | A1* | 5/2015 | Just | G06Q 20/10 |
| | | | | 705/44 |
| 2015/0140934 | A1* | 5/2015 | Abdurrahman | H04W 4/70 |
| | | | | 455/41.2 |
| 2015/0234477 | A1* | 8/2015 | Abovitz | G06K 9/00671 |
| | | | | 382/103 |
| 2015/0277566 | A1* | 10/2015 | Musgrave | H04N 5/23241 |
| | | | | 345/156 |
| 2016/0014266 | A1* | 1/2016 | Bhatt | H04M 1/7253 |
| | | | | 455/556.1 |
| 2016/0028869 | A1* | 1/2016 | Bhatt | H04M 1/7253 |
| | | | | 455/41.2 |
| 2016/0037345 | A1* | 2/2016 | Margadoudakis | H04L 63/0853 |
| | | | | 455/411 |
| 2016/0037346 | A1* | 2/2016 | Boettcher | H04M 1/72519 |
| | | | | 455/411 |
| 2016/0109954 | A1* | 4/2016 | Harris | G06F 3/017 |
| | | | | 345/156 |
| 2016/0109958 | A1* | 4/2016 | Moon | G06F 3/017 |
| | | | | 345/156 |
| 2016/0337863 | A1* | 11/2016 | Robinson | H04W 12/08 |
| 2016/0354042 | A1* | 12/2016 | Shim | G06F 21/32 |
| 2016/0379205 | A1* | 12/2016 | Margadoudakis | G06Q 20/327 |
| | | | | 705/71 |
| 2017/0010669 | A1* | 1/2017 | Lim | G06F 3/015 |
| 2017/0038847 | A1* | 2/2017 | Schorsch | G06F 3/017 |
| 2017/0039535 | A1* | 2/2017 | Park | G06Q 20/102 |
| 2017/0039613 | A1* | 2/2017 | Kaehler | G02B 27/0172 |
| 2017/0061405 | A1* | 3/2017 | Bryant | G06Q 20/4014 |
| 2017/0061422 | A1* | 3/2017 | Castinado | G06Q 20/3224 |
| 2017/0061423 | A1* | 3/2017 | Bryant | G06Q 20/3224 |
| 2017/0061424 | A1* | 3/2017 | Dent | G06Q 20/3224 |
| 2017/0068956 | A1* | 3/2017 | Jones | G06Q 20/401 |
| 2017/0103440 | A1* | 4/2017 | Xing | H04W 4/90 |
| 2017/0180336 | A1* | 6/2017 | Josephson | G06F 21/32 |
| 2017/0235935 | A1* | 8/2017 | Song | G06F 21/32 |
| | | | | 726/19 |
| 2017/0308118 | A1* | 10/2017 | Ito | A61B 5/0488 |
| 2018/0011544 | A1* | 1/2018 | Franklin | G06F 3/017 |
| 2018/0137480 | A1* | 5/2018 | Houghton, IV | H04W 4/70 |
| 2019/0139050 | A1* | 5/2019 | Maheshwari | G06K 9/00335 |

FOREIGN PATENT DOCUMENTS

| | | |
|---|---|---|
| EP | 3001282 A1 | 3/2016 |
| EP | 3013111 A1 | 4/2016 |

OTHER PUBLICATIONS

Extended European Search Report in related EP Application No. EP19163772.7, dated Jun. 14, 2019.

* cited by examiner

SYSTEMS AND METHODS FOR TRANSLATING A GESTURE TO INITIATE A FINANCIAL TRANSACTION

FIELD OF INVENTION

The present disclosure relates to systems and methods for initiating and/or facilitating a financial transaction in response to detecting and translating a spatial gesture.

BACKGROUND

It has become increasingly common to conduct financial transactions that are facilitated by an electronic payment system. PayPal™, for example, provides an online payment system and supports electronic transactions via a mobile application. Similarly, other applications, such as Venmo™ and Square™ Cash App, also provide systems that facilitate transactions between parties. While some payment systems may provide simplified payment mechanisms, such as payment by near-field communications, these methods typically still require one or more of the users to access a user device, find and access a specific application on the user device, configure the transaction (e.g., manually enter payment amount, payment account information, identify payee account information, etc.), and manually input authentication information and/or final approval of the transaction. Such a method may be unnecessarily cumbersome and inconvenient.

Accordingly, there is a need for systems and methods for more easily initiating and/or facilitating a financial transaction. Embodiments of the present disclosure are directed to this and other considerations.

SUMMARY

Disclosed embodiments provide systems and methods for facilitating a financial transaction in response to detecting and translating one or more spatial gestures.

According to some embodiments, a payor transaction device can be configured for conducting gesture-based transactions using an associated payor financial account. The payor transaction device can include a processor, a motion-detection device, a communication interface, and a memory couple to the processor and storing instructions. The instructions, when executed by the processor, can cause the payor transaction device to detect, via the motion-detection device, a payor spatial gesture corresponding to an initiate-payment gesture of one or more predetermined spatial gestures. Responsive to detecting the payor spatial gesture, the instructions, when executed by the processor, can cause the payor transaction device to receive, at the communication interface and from a payee transaction device, payee account information data corresponding to a payee financial account associated with the payee transaction device. The instructions, when executed by the processor, can also cause the payor transaction device to transmit, via the communication interface and to a payor computing device, transaction data that can comprise the payee account information data and payor gesture data corresponding to the payor spatial gesture.

According to some embodiments, a system for conducting gesture-based transactions can comprise a processor, a communication interface, and a memory couple to the processor and storing instructions. The instructions, when executed by the processor, can cause the system to receive, from a first transaction device associated with a first financial account and via the communication interface, transaction data. The transaction data can include account information corresponding to a second financial account that is not associated with the first transaction device and first gesture data representative of a first spatial gesture detected by the first transaction device, where the first gesture data is indicative of a requested transaction to transfer funds between the first and second financial accounts. The instructions, when executed by the processor, can also cause the system to transmit, via the communication interface and to a financial service provider server, at least a portion of the transaction data to enable the financial service provider server to facilitate the requested transaction.

According to some embodiments, a system for conducting gesture-based transactions can comprise a processor, a communication interface, and a memory coupled to the processor and storing instructions. The instructions, when executed by the processor, can cause the system to receive, via the communication interface, transaction data from a transaction device associated with a financial account. The transaction data can comprise gesture data corresponding to a spatial gesture obtained by the transaction device, and the gesture can be indicative of a desired financial transaction. The instructions, when executed by the processor, can also cause the system to transmit, via the communication interface and to a financial service provider server, at least a portion of the transaction data to enable the financial service provider server to conduct the desired transaction.

Further features of the disclosed system and methods, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
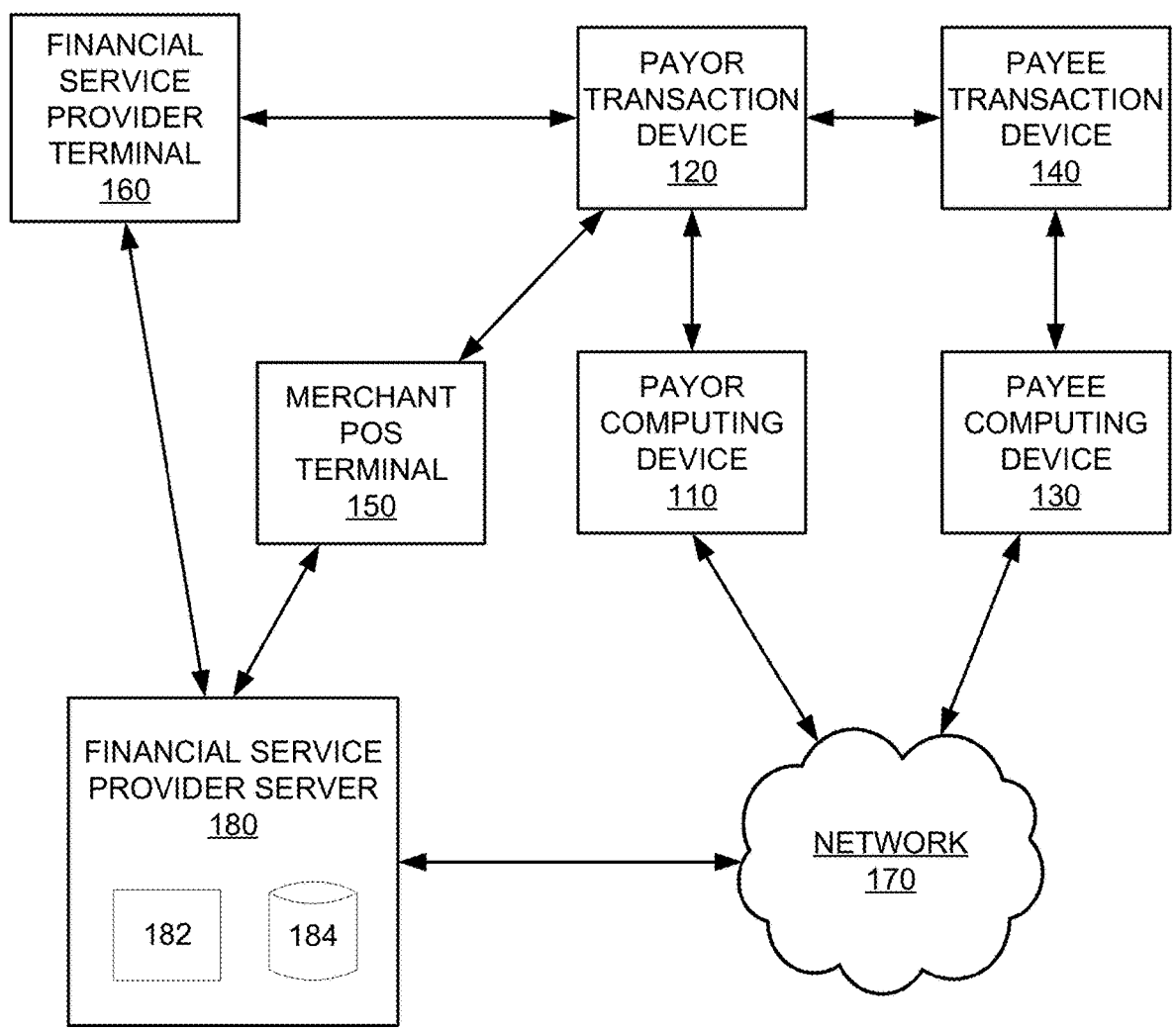
FIG. 1 is a diagram of an exemplary system that may be used facilitate a financial transaction in response to detecting and translating a spatial gesture.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for initiating and/or facilitating a financial transaction in response to detecting and translating a spatial gesture. As discussed more fully below, various systems and methods can facilitate a peer-to-peer transaction (i.e., between two users), and various systems and methods can facilitate a transaction involving a user and a merchant POS terminal or a financial service provider terminal.

Consistent with the disclosed embodiments, a method of initiating and/or facilitating a financial transaction in response to detecting and translating a spatial gesture may include detecting, with a user device associated with a payor (e.g., a payor transaction device), a payor spatial gesture corresponding to a payment gesture of one or more predetermined spatial gestures and, responsive to detecting the payor spatial gesture, receiving payee account information from a user device associate with a payee (e.g., a payee transaction device). The payor transaction device and/or the payee transaction device may be, in some instances, a wearable device such as a smart ring, a smart watch, a smart bracelet, or the like. The method may also include transmitting, from the payor's user device and to a computing device associated with the payor, transaction data comprising the payee's account information and data indicative of the payor spatial gesture that was detected by the payor's user device. The method may also include transmitting, from the payor's computing device and to a financial service provider server, at least a portion of the transaction data to enable the financial service provider server to facilitate the requested transaction. As discussed in more detail below, the method may also include detecting and translating one or more additional spatial gestures corresponding to, for example, waking the payor transaction device from a sleep mode to a ready mode or authenticating a transaction. The method may also include detecting, with a payee transaction device, a payee spatial gesture and comparing the payee spatial gesture to the payor spatial gesture.

Consistent with the disclosed embodiments, a method of initiating and/or facilitating a financial transaction in response to detecting and translating a spatial gesture may include detecting, with a payor's user device, a payor spatial gesture corresponding to a payment gesture of one or more predetermined spatial gestures, and responsive to detecting the payor spatial gesture, transmitting, from the payor's user device and to a computing device associated with the payor, transaction data comprising data indicative of the payor spatial gesture that was detected by the payor's user device. The method may also include transmitting, from the payor's computing device and to a merchant point-of-sale terminal, at least a portion of the transaction data and data indicative of a financial account associated with the payor to enable a merchant point-of-sale terminal to communicate with a financial service provider and/or process payment of a sale. According to some embodiments, the method may include transmitting, from the payor's user device to the merchant point-of-sale terminal, at least a portion of the transaction data and data indicative of the payor's financial account, such that transmission of data to and from the payor's computing device is not necessary.

Consistent with the disclosed embodiments, a method of initiating and/or facilitating a financial transaction in response to detecting and translating a spatial gesture may include detecting, with a payor's user device, a payor spatial gesture corresponding to a transaction gesture of one or more predetermined spatial gestures, and responsive to detecting the payor spatial gesture, transmitting, from the payor's user device and to a financial service provider terminal, transaction data comprising data indicative of the payor spatial gesture that was detected by the payor's user device. The transaction gesture may correspond to various commands, such as a command to withdraw cash from the financial service provider terminal (e.g., in embodiments where the financial service provider terminal is an automated teller machine). The method may include transmitting data indicative of the transaction gesture directly to the financial service provider terminal or may include transmitting the transaction gesture data to the payor's computing device, which in turn transmits the transaction gesture, alone or with additional data such as geolocation data and/or additional authentication data, to the financial service provider terminal. The method may enable the financial service provider terminal to facilitate the requested transaction, which may include transmitting at least some of the data received from the payor's user device and/or the payor's computing device to a financial service provider server to process and/or conduct the requested transaction.

Various embodiments of the disclosed technology may be useful to easily conduct and/or initiate transactions between a payor, a payee and/or a merchant POS terminal, a financial service provider terminal, or any combination thereof. For example, a transaction may be conducted and/or initiated simply by shaking hands with a person or by performing some other predetermined gesture. Various embodiments of the disclosed technology may be useful to easily provide authentication for a transaction or some other application. For example, a transaction may be authorized by the performance of a "secrete handshake" or some other predetermined gesture. Various embodiments of the disclosed technology may reduce the time, effort, and frustration associated with conducting a transaction, initiating a transaction, and/or providing authentication information.

To the extent that any of the disclosed embodiments are directed towards methods, it is contemplated that such methods may be embodied in both systems and non-transitory computer readable medium. A system may include one or more memory devices storing instructions, and one or more processors configured to execute the instructions to perform steps of a method of initiating and/or facilitating a financial transaction in response to detecting and translating a spatial gesture as described herein. A non-transitory computer-readable medium may store instructions that, when executed by one or more processors, may cause a computing device to perform a method of initiating and/or facilitating a financial transaction in response to detecting and translating a spatial gesture as described herein.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 is a diagram of an example system that may be configured to perform one or more processes that can facilitate a financial transaction in response to detecting and translating a spatial gesture. The components and arrangements shown in FIG. 1 are not intended to limit the disclosed embodiments as the components used to implement the disclosed processes and features may vary.

According to some embodiments, a payor computing device 110 (e.g., a smart phone, tablet computer, portable laptop computer, or other computing device) may be in communication with a payor transaction device 120 that is configured to detect spatial gestures. In some embodiments, payor transaction device 120 may include a motion-detection device. In some embodiments, the motion-detection device may include a motion sensing micro-electromechanical system (MEMS) or an inertial module. In certain embodiments, the motion-detecting device may include one or more of an accelerometer (e.g., a three-axis accelerometer or any other applicable type of accelerometer), a gyroscope, a magnetometer, an inertial sensor, or any other device operable to detect motion, acceleration, and/or inertia. Similarly, in some embodiments, a payee computing device 130 (e.g., a smart phone, tablet computer, portable laptop computer, or other computing device) may be in communication with a payee transaction device 140 that is also configured to detect spatial gestures (e.g., with a motion-detection device, which may include one or more of an accelerometer, a gyroscope, a magnetometer, an inertial sensor, or any other device operable to detect motion, acceleration, and/or inertia). In some embodiments, payor transaction device 120 and/or payee transaction device 140 may be a smart payment card or a smart wearable device, such as, for example and not limitation, a smart watch, smart ring, smart bracelet, or smart clothing (e.g., a jacket or shirt having at least some of the electronics and/or operability discussed herein). In certain embodiments, payor transaction device 120 may be in communication with payee transaction device 140. In certain embodiments, payor computing device 110 may be in communication with payee computing device 130. In certain embodiments, payor transaction device 120 and/or payee transaction device 140 may be capable of transmitting data—such as gesture data corresponding to detected spatial gestures or account information data indicative of a financial account associated with payor transaction device 120 or payee transaction device 140, respectively—and can transmit the data to one another and/or to payor computing device 110 or payee computing device 130, respectively. According to certain embodiments, each of payor computing device 110, payor transaction device 120, payee computing device 130, and payee transaction device 140 can be in communication, such as wired communication or wireless communication, with one, some, or all of the other devices (e.g., payor computing device 110, payor transaction device 120, payee computing device 130, and/or payee transaction device 140).

In some embodiments, payor transaction device 120 and/or payor computing device 110 may be in communication with a merchant point-of-sales (POS) terminal 150, and in some embodiments, merchant POS terminal 150 may be in communication with financial service provider server 180.

In certain embodiments, payor computing device 110, payor transaction device 120, payee computing device 130, payee transaction device 140, merchant POS terminal 150, financial service provider terminal 160, and/or financial service provider server 180 may be in communication with network 170. In some embodiments, payor computing device 110, payor transaction device 120, payee computing device 130, payee transaction device 140, merchant POS terminal 150, and/or financial service provider terminal 160 may be in communication with a financial service provider server 180. In some embodiments, communication with the financial service provider server may be via network 170, via a direct line of communication, or via an intranet or other secured and/or internal network. According to certain embodiments, each of the payor computing device 110, the payor transaction device 120, the payee computing device 130, the payee transaction device 140, the merchant POS terminal, and the financial service provider terminal 160 can be in communication, such as wired communication or wireless communication or via network 170, with one, some, or all of the other devices (e.g., the payor computing device 110, the payor transaction device 120, the payee computing device 130, the payee transaction device 140, the merchant POS terminal, and/or the financial service provider terminal 160 can be in communication). In certain embodiments, one, some, or all of the payor computing device 110, the payor transaction device 120, the payee computing device 130, the payee transaction device 140, the merchant POS terminal, and the financial service provider terminal 160 may be in communication, such as wired communication or wireless communication or via network 170, with financial service provider server 180.

Network 170 may be of any suitable type, including individual connections via the internet such as cellular or WiFi™ networks. In some embodiments, network 170 may connect payor computing device 110, payor transaction device 120, payee computing device 130, payee transaction device 140, merchant POS terminal 150, financial service provider terminal 160, and/or financial service provider server 180 using direct connections such as radio-frequency identification (RFID), near-field communication (NFC), Bluetooth™, Bluetooth™ low-energy (BLE) (e.g., BLE mesh and/or thread), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Similarly, payor computing device 110, payor transaction device 120, payee computing device 130, payee transaction device 140, merchant POS terminal 150, financial service provider terminal 160, and/or financial service provider server 180 may communicate with one another using direct connections such as radio-frequency identification (RFID), near-field communication (NFC), Bluetooth™, Bluetooth™ low-energy (BLE) (e.g., BLE mesh and/or thread), WiFi™ ZigBee™, ambient backscatter communications (ABC) protocols, USB, or LAN. Depending on whether confidentiality is desired, in some embodiments, these connections may be encrypted or otherwise secured.

Figure 2:
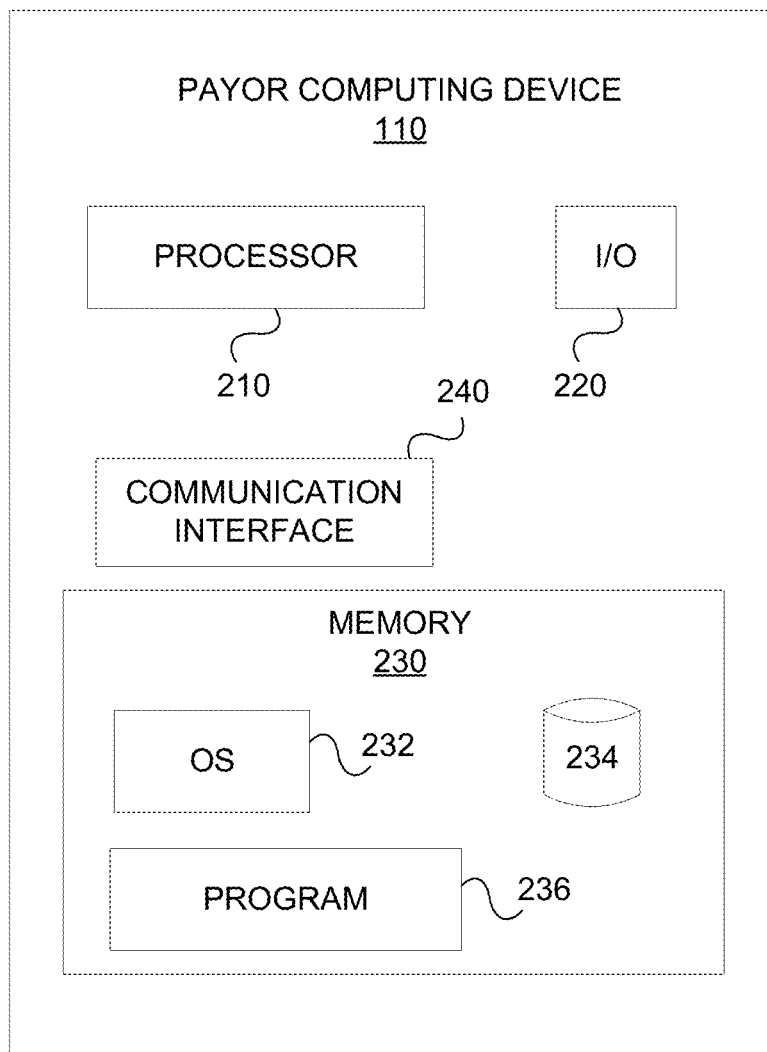
FIG. 2 is a component diagram of an exemplary payor computing device.

An example embodiment of payor computing device 110 is shown in more detail in FIG. 2. Payee computing device 130 may have a similar structure and components that are similar to those described with respect to payor computing device 110, or payee computing device 130 may include more or fewer components than payor computing device 110. As shown, payor computing device 110 may include a processor 210; an input/output ("I/O") device 220; a memory 230 containing an operating system ("OS") 232, a storage device 234, which may be any suitable repository of data and may include a gesture database including data corresponding to one or more predetermined spatial gestures, and a program 236; and a communication interface 240. In some embodiments, communication interface 240 may include a transceiver. In some embodiments, payor computing device 110 may further include a peripheral interface, a mobile network interface in communication with processor 210, a bus configured to facilitate communication between the various components of payor computing device 110, and/or a power source configured to power one or more components of payor computing device 110. In certain embodiments, payor computing device 110 may include a geographic location sensor ("GLS") for determining the geographic location of payor computing device 110. In certain embodiments, payor computing device 110 may include a user interface ("U/I") device for receiving user input data, such as data representative of a click, a scroll, a tap, a press, or typing on an input device that can detect tactile inputs. In some embodiments, user input data may also include biometric data associated with a user of computing device 120 obtained by one or more sensors. In some embodiments, payor computing device 110 may include a microphone and/or an image capture device, such as a digital camera.

According to some embodiments, payor computing device 110 may include one or more motion-detecting devices, such as one or more of an accelerometer (e.g., a three-axis accelerometer or any other applicable type of accelerometer), a gyroscope, a magnetometer, an inertial sensor, or any other device operable to detect motion, acceleration, and/or inertia. In some embodiments, payor computing device 110 may include some or all of the hardware, software, or logic included in payor transaction device 120, and payor computing device 110 may be configured to perform some or all of the functions of payor transaction device 120, as described herein.

In some embodiments, payor computing device 110 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, Bluetooth™ low-energy (BLE) (e.g., BLE mesh and/or thread), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, payor computing device 110 may be configured to remotely communicate with one or more other devices, such as payor transaction device 120, payee computing device 130, merchant POS terminal 150, financial service provider terminal 160, and/or financial service provider server 180. In some embodiments, payor computing device 110 may be configured to communication with one or more devices via network 170. According to some embodiments, payor computing device 110 may be configured to receive and transmit gesture data and/or account information data indicative of a financial account associated with payor computing device 110.

Processor 210 may include one or more of an application specific integrated circuit (ASIC), programmable logic device, microprocessor, microcontroller, digital signal processor, co-processor or the like or combinations thereof capable of executing stored instructions and operating upon stored data. Memory 230 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 232, application programs 236 (including, for example, a web browser application, a widget or gadget engine, and or other applications, as necessary), executable instructions and data. In some embodiments, processor 210 may include a secure microcontroller, which may be configured to transmit and/or facilitate payment transactions and/or cryptography. In some embodiments, processor 210 may comprise a single secure microcontroller configured to transmit and/or facilitate payment, encrypt and/or decrypt data, and/or process any other program instructions. In some embodiments, processor 210 may include one or more secure microcontrollers and/or other processing devices such that one or more secure microcontroller is configured to transmit and/or facilitate payment and/or encrypt and/or decrypt data, while one or more other processing device is configured to process any other program instructions. In some embodiments, some or all of the processing techniques described herein can be implemented as a combination of executable instructions and data within memory 230.

Processor 210 may be one or more known processing devices, such as a microprocessor from the Pentium™ family manufactured by Intel™, the Turion™ family manufactured by AMD™, or the Cortex™ family or SecurCore™ manufactured by ARM™. Processor 210 may constitute a single-core or multiple-core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Payor computing device 110 may include one or more storage devices 234 configured to store information used by processor 210 (or other components) to perform certain functions related to the disclosed embodiments. As an example, payor computing device 110 may include memory 230 that includes instructions to enable processor 210 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, payor computing device 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, payor computing device 110 may include memory 230 that may include one or more programs 236 to perform one or more functions of the disclosed embodiments. Moreover, processor 210 may execute one or more programs 236 located remotely from, for example and not limitation, financial service provider terminal 160 or financial service provider server 180. For example, payor computing device 110 may access one or more remote programs 236, that, when executed, perform functions related to one or more disclosed embodiments. In some embodiments, one or more programs 236 may be configured to receive payor gesture data indicative of a spatial gesture (e.g., detected by payor transaction device 120 or payor computing device 110) and translate the spatial gesture, such as by comparing the payor gesture data to a gesture database including data corresponding to one or more predetermined spatial gestures. In certain embodiments, program(s) 236 may be configured to receive payee gesture data indicative of a spatial gesture (e.g., detected by payee transaction device 140 or payee computing device 130) and translate the spatial gesture, such as by comparing the payee gesture data to a gesture database including data corresponding to one or more predetermined spatial gestures. In some embodiments, program(s) 236 may be configured to receive payee account information data that is indicative of a financial account associated with payee computing device 130 and/or payee transaction device 140. In some embodiments, program(s) 236 may be configured to receive the payor gesture data, the payee gesture data, and/or the payee account information data from one, some, or all of payor transaction device 120, payee computing device 130, or payee transaction device 140.

In some embodiments, program(s) 236 may be configured to transmit the payor gesture data, the payee gesture data, the payee account information data, and/or payor account information data (i.e., data indicative of a financial account associated with payor computing device 110, and/or payor transaction device 120) to financial service provider terminal 160 and/or financial service provider server 180 directly or via network 170.

According to some embodiments, payee computing device 130 and/or payee transaction device 140 may be configured to function as a second payor computing device and/or a second payor transaction device, respectively, which may be useful in "split-payment" situations. As a non-limiting example, two users may wish the split the cost of a product. Thus, program(s) 236 of the payor computing device 110 and program(s) of the second payor computing device (i.e., payee computing device 130) may be configured to transmit gesture data and/or financial account information data (i.e., data indicative of a financial account associated with payor computing device 110, payor transaction device 120, payee computing device 130, or payee transaction device 140, as the case may be) to, for example, merchant POS terminal 150. In some embodiments, program(s) 236 of the payor computing device 110 and program(s) of the second payor computing device (i.e., payee computing device 130) may be configured such that both transmit gesture data and/or financial account information data to merchant POS terminal 150. In some embodiments, program(s) 236 of the payor computing device 110 and program(s) of the second payor computing device (i.e., payee computing device 130) may be configured to receive gesture data and/or financial account information data from the other of payor computing device 110 and the second payor computing device (i.e., payee computing device 130), and program(s) 236 of the payor computing device 110 and program(s) of the second payor computing device (i.e., payee computing device 130) may be configured to receive at least some of the combined gesture data and/or financial account information data (i.e., at least some of: the gesture data and/or financial account information data from the payor computing device 110 and the gesture data and/or financial account information data from the second payor computing device (i.e., payee computing device 140)).

In some embodiments, program(s) 236 of the payor computing device 110 may be configured to receive and/or transmit authentication data. In some embodiments, program(s) 236 of the payor computing device 110 may be configured to receive authentication gesture data corresponding to an authenticating spatial gesture detected by payor transaction device 120. In some embodiments, program(s) of the payor computing device 110 may be configured to verify the authentication gesture data, such as by comparing the authentication gesture data to a gesture database including data corresponding to one or more predetermined spatial gestures. For example, in some embodiments, program(s) of the payor computing device 110 may be configured to transmit the authentication gesture data to a remote application or program server via network 170. In some embodiments, program(s) 236 of the payor computing device 110 may be configured to receive and/or transmit authentication data, which may include geographic location data corresponding to a geographic location detected by a GLS of the payor computing device 110, biometric information (e.g., fingerprint or voice data), and/or additional secret information (e.g., a PIN, password, or passcode). In some embodiments, program(s) of the payor computing device 110 may be configured to withhold transmission of the at least a portion of the transaction data (which may include, for example, payor gesture data, payee account information data, or any other data necessary to conduct a transaction) until verification of the authentication data (e.g., authentication gesture data, geographic location data, etc.) has been received.

According to certain embodiments, payor computing device 110 may be configured to communicate with financial service provider terminal 160 and/or financial service provider server 180. In some embodiments, financial service provider terminal 160 may comprise an automatic teller machine (ATM). In certain embodiments, program(s) 236 of the payor computing device 110 may be configured to transmit transaction data, which may include, for example, data indicative of a request to withdraw cash, to financial service provider terminal 160. In some embodiments, program(s) 236 of the payor computing device 110 may be configured to transmit authentication data, geographic location data, or any other type of data to financial service provider terminal 160 and/or financial service provider server 180.

Memory 230 may include one or more memory devices that store data and instructions used to perform one or more features of the disclosed embodiments. Memory 230 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a gesture database including data for storing related data to enable payor computing device 110 to perform one or more of the processes and functionalities associated with the disclosed embodiments. In certain embodiments, the gesture database may include data corresponding to one or more predetermined spatial gestures. In some embodiments, the predetermined spatial gestures may be preset (e.g., "factory settings") or may be set or altered according to a user's preferences. For example, payor transaction device 110 may be configured to "record" one or more gestures performed by a user and save a meaning to each of the recorded gestures (e.g., payor transaction device can detect a spatial gesture performed by a user; save, to memory 230, data indicative of the performed spatial gesture; and save, to memory 230, a meaning corresponding to the performed spatial gesture).

Payor computing device 110 may also be communicatively connected to one or more memory devices (e.g., databases (not shown)) locally or through a network. The remote memory devices may be configured to store information and may be accessed and/or managed by payor computing device 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

In example embodiments of the disclosed technology, payor computing device 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While payor computing device 110 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the payor computing device 110 may include a greater or lesser number of components than those illustrated.

Figure 3:
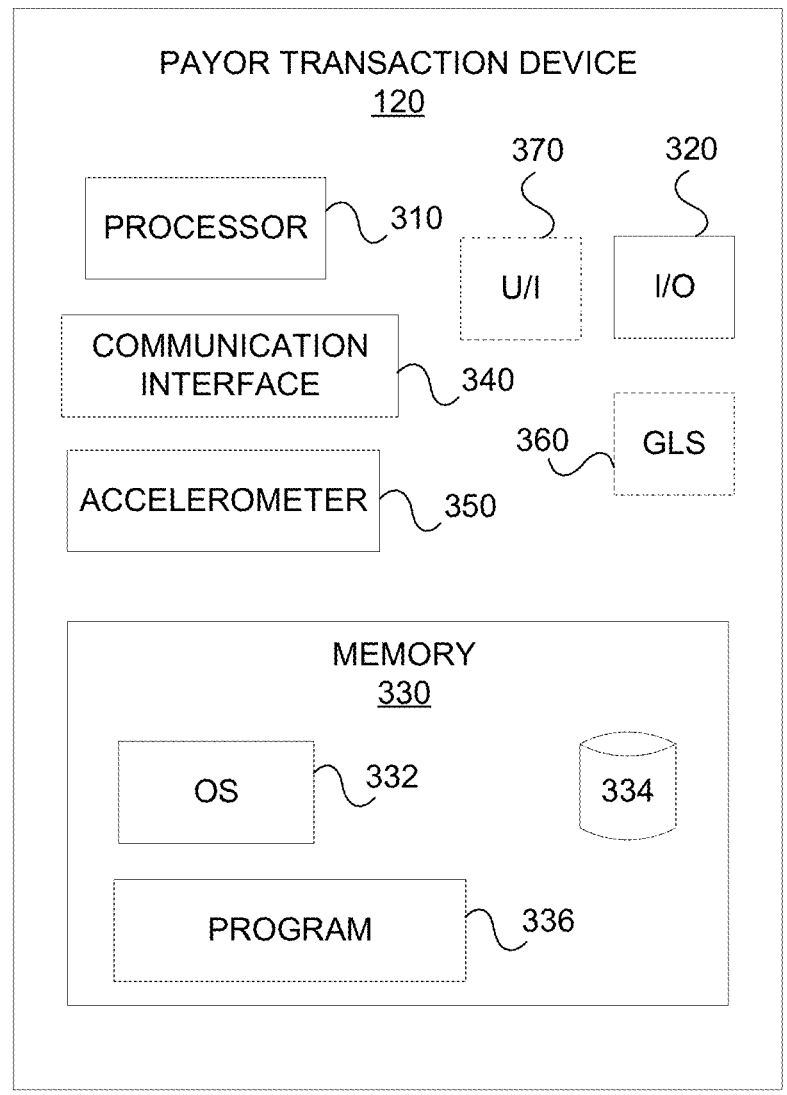
FIG. 3 is a component diagram of an exemplary payor transaction device.

An example embodiment of payor transaction device 120 is shown in more detail in FIG. 3. Payee transaction device 140 may have a similar structure and components that are similar to those described with respect to payor transaction device 120. As shown, payor transaction device 120 may include a processor 310; an input/output ("I/O") device 320; a memory 330 containing an operating system ("OS") 332, a storage device 334, which may be any suitable repository of data and may include a gesture database including data corresponding to one or more predetermined spatial gestures, and/or a program 336; a communication interface 340; an accelerometer 350 (Although "accelerometer 350" is used herein, one of skill in the art should recognize that this disclosure contemplates any motion-detecting device, a non-exhaustive list of which also includes a gyroscope, a magnetometer, an inertial sensor, or any other device operable to detect motion, acceleration, and/or inertia.); a geographic location sensor ("GLS") for determining the geographic location of payor transaction device 120; and/or a user interface ("U/I") device 370 for receiving user input data, such as data representative of a click, a scroll, a tap, a press, or typing on an input device that can detect tactile inputs. In some embodiments, user input data may include biometric data associated with a user of payor transaction device 120 obtained by one or more sensors. In some embodiments, communication interface 340 may include a transceiver. In some embodiments, payor transaction device 120 may further include a peripheral interface, a mobile network interface in communication with processor 310, a bus configured to facilitate communication between the various components of payor transaction device 120, and/or a power source configured to power one or more components of payor transaction device 120. Some embodiments may exclude certain components discussed herein. For example, in certain embodiments, payor transaction device 120 may not include an OS, depending on the complexity of the program instructions. Embodiments not including an OS may have comparative limited functionality but may also decrease power consumption of payor transaction device 120. The various components of payor transaction device 120 may include the same or similar attributes or capabilities of the same or similar components discussed with respect to payor computing device 110.

According to some embodiments, accelerometer 350 may be configured to detect spatial gestures. In some embodiments, accelerometer 350 and/or processor 310 may be configured to create gesture data representative of spatial gestures based on detected spatial gestures.

In certain embodiments, one or more programs 336 may be configured to have a sleep mode configured for only detecting a waking spatial gesture (or some other waking trigger or input, such as a wake button being pressed) and a ready mode configured for detecting one or more predetermined gestures. In some embodiments, storage device 334 may include a gesture database including data corresponding to one or more predetermined spatial gestures, such as a waking spatial gesture. In some embodiments, storage device 334 may include a gesture database that includes data corresponding to only a single spatial gesture, such as a waking spatial gesture. In some embodiments, program(s)

336 may be configured to detect (e.g., with accelerometer 350) a waking spatial gesture and quantify the detected waking spatial gesture as waking gesture data. Program(s) 336 may be configured to verify the detected waking spatial gesture by, for example, comparing the waking gesture data to a gesture database including data corresponding to a waking spatial gesture. Responsive to verifying the detected waking spatial gesture, program(s) 336 may be configured to transition from sleep mode to ready mode in which program(s) 336 may be configured to detect one or more predetermined gestures.

In some embodiments, sleep mode may be configured for only detecting either a waking spatial gesture or the presence of, and/or pairing with, another transaction device within a predetermined range. In some embodiments, the predetermined range can be less than the full range in which payor transaction device 120 can detect another transaction device. In certain embodiments, program(s) 336 may be configured to detect gestures within a predetermined time after detecting another transaction device. In some embodiments, program(s) 336 may be configured to transmit or receive data, such as financial account information data, within a predetermined time after detecting another transaction device.

According to some embodiments, program(s) 336 may be configured to detect and translate multiple spatial gestures, some or all of which correspond to different commands. For example, program(s) 336 may be configured to determine that a detected waking spatial gesture corresponds to a waking command (as described above), that a detected initiate-payment spatial gesture corresponds to a command to initiate payment, and/or that a detected cancel spatial gesture corresponds to a command to cancel, for example, a command corresponding to the most recently detected spatial gesture. One of skill in the art will recognize that program(s) 336 can perform any other gesture-to-command translations, as desired.

In some embodiments, an initiate-payment spatial gesture may correspond to a command to initiate a payment, and the recipient financial account of the transaction may be a financial account associated with a device detected by, or paired with, payor transaction device 120. For example, payor transaction device 120 may detect or be paired with payee transaction device 140, and upon detecting and translating an initiate-payment spatial gesture, program(s) 336 may be configured to receive payee account information data from payee transaction device 140. In some embodiments, a transaction device (e.g., payor transaction device 120) may determine, based on detection and/or identification of an initiate-payment spatial gesture, that it will be the payor device in a transaction. Responsive to determining that it is the payor device, payor transaction device may search for one or more payee transaction devices 140 or other devices (e.g., merchant POS terminal 150 or financial service provider terminal 160) within a predetermined proximity of payor and/or within a predetermined amount of time after detecting the initiate-payment spatial gesture.

As another example, payor transaction device 120 may detect or be paired with merchant POS terminal 150 and may be configured to receive payee account information data from merchant POS terminal 150. In some embodiments, program(s) 336 may be configured to receive payee account information data from payee transaction device 140, merchant POS terminal 150, or any other device upon detecting or being paired with each respective device. In some embodiments, the received payee account information data may be stored in memory for a predetermined period, such as, for example, until payor transaction device 120 transmits the payee account information, until payor transaction device 120 detects a cancel spatial gesture, or until a predetermined amount of time has expired.

In some embodiments, responsive to detecting and translating an initiate-payment spatial gesture and receiving payee account information, program(s) 336 may be configured to transmit, to payor computing device 110, transaction data, which can include at least a portion of gesture data indicative of the detected spatial gesture and the payee account information.

In certain embodiments, responsive to detecting a gesture, program(s) 336 may be configured to transmit, to payor computing device 110 data indicative of the detected spatial gesture and may be configured to receive a command corresponding to the detected spatial gesture. If the received command is an initiate-payment command, program(s) 336 may be configured to transmit the payee account information to the payor computing device 110.

According to some embodiments, payor transaction device 120 may include a sensor or other device configured to detect the proximity of a payee device (e.g., by a signal strength of a communication signal between payor transaction device 120 and the payee device), such as payee transaction device 140, merchant POS terminal 150, and/or financial service provider terminal 160, and program(s) 336 may be configured to determine whether the corresponding payee device is within a predetermined range (i.e., less than a capable or effective range) of payee transaction device 120. In some embodiments, program(s) 336 may be configured to require that the corresponding payee device be within a predetermined range before data transmission, authentication, or any other predetermined step or function is performed by payee transaction device 120. In some embodiments, the predetermined range may be 1 foot, 3 feet, 5 feet, 10 feet, 30 feet, or any other appropriate distance.

In some embodiments, program(s) 336 may be configured to request, from a user, input indicative of a transaction amount. Program(s) 336 may be configured to transmit, to payor computing device 110, a request for a transaction amount, or program(s) 336 may be configured to request a transaction amount via the payor transaction device 120 itself. For example, program(s) 336 may be configured to request a transaction amount by emitting a sound with a speaker of payor transaction device 120 (e.g., a beep, chime, natural language request, etc.), by emitting light from, for example, an LED of payor transaction device 120, or by displaying a textual or graphic request for a transaction amount on a display of payor transaction device 120. In some embodiments, program(s) 336 may be configured to receive input indicative of a transaction amount, such as by tactile input (e.g., a keyboard or touch screen of payor transaction device 120) or by recording natural language input with a microphone of payor transaction device 120. In some embodiments, program(s) 336 may be configured to transmit, to payor computing device 110, a recording of the natural language input as a portion of the transaction or separately for translation by any appropriate voice recognition software or application. In some embodiments, memory 330 of payor transaction device 120 includes a voice recognition application configured to determine a transaction amount from the natural language input, and program(s) 336 may be configured to the transaction amount to payor computing device 110 as a portion of the transaction or separately. In some embodiments, payor computing device 110 and/or payor transaction device 120 may be configured to display or otherwise offer one or more predetermined transaction amounts. The predetermined transaction amounts may be stored on memory of payor computing device 110 and/or payor transaction device 120, and payor computing device 110 and/or payor transaction device 120 may be configured to detect selection of a desired transaction amount. In some embodiments, the desired transaction amount may be indicated via gesture (e.g., a tap, a series of taps, a spatial gesture), a button press, or any other applicable input method.

According to some embodiments, program(s) 336 may be configured to require authentication prior to transmitting transaction data or otherwise executing an initiate-payment command. In some embodiments, responsive to detecting and translating an initiate-payment spatial gesture (or receiving a command translation of an initiate-payment spatial gesture), program(s) 336 may be configured to request an authentication spatial gesture. In some embodiments, program(s) 336 may be configured to detect an authentication spatial gesture within a predetermined amount of time following a determination that a detected spatial gesture corresponds to an initiate-payment command. In some embodiments, program(s) 336 may be configured to provide some indication to a user that authentication is required. In some embodiments, program(s) 336 may be configured to request authentication by emitting a sound with a speaker of payor transaction device 120 (e.g., a beep, chime, natural language request, etc.); by emitting light from, for example, an LED of payor transaction device 120; or by displaying a textual or graphic request for authentication on a display of payor transaction device 120. In some embodiments, program(s) 336 may be configured to receive input indicative of authentication, such as by tactile input (e.g., receiving a PIN, password, or passcode with a keyboard or touch screen of payor transaction device 120), by recording natural language input with a microphone of payor transaction device 120 (e.g., using a voice recognition of payor transaction device 120, payor computing device 110, or some other device to recognize a PIN, password, or passcode), or using one or more sensors of payor transaction device to measure biometric information, such as retinal scanning, iris recognition, or voice biometrics. In some embodiments, program(s) 336 may be configured to require and/or request multiple types of authentication to provide added security.

In certain embodiments, program(s) 336 may be configured to receive payee gesture data from payee computing device 130 or payee transaction device 140. In certain embodiments, program(s) 336 may be configured to transmit the payee gesture data to, for example, payor computing device 110. In some embodiments, program(s) 336 may be configured to translate the payee gesture data by, for example, comparing the payee gesture data to a gesture database including data corresponding to one or more predetermined spatial gestures.

Figure 4A:
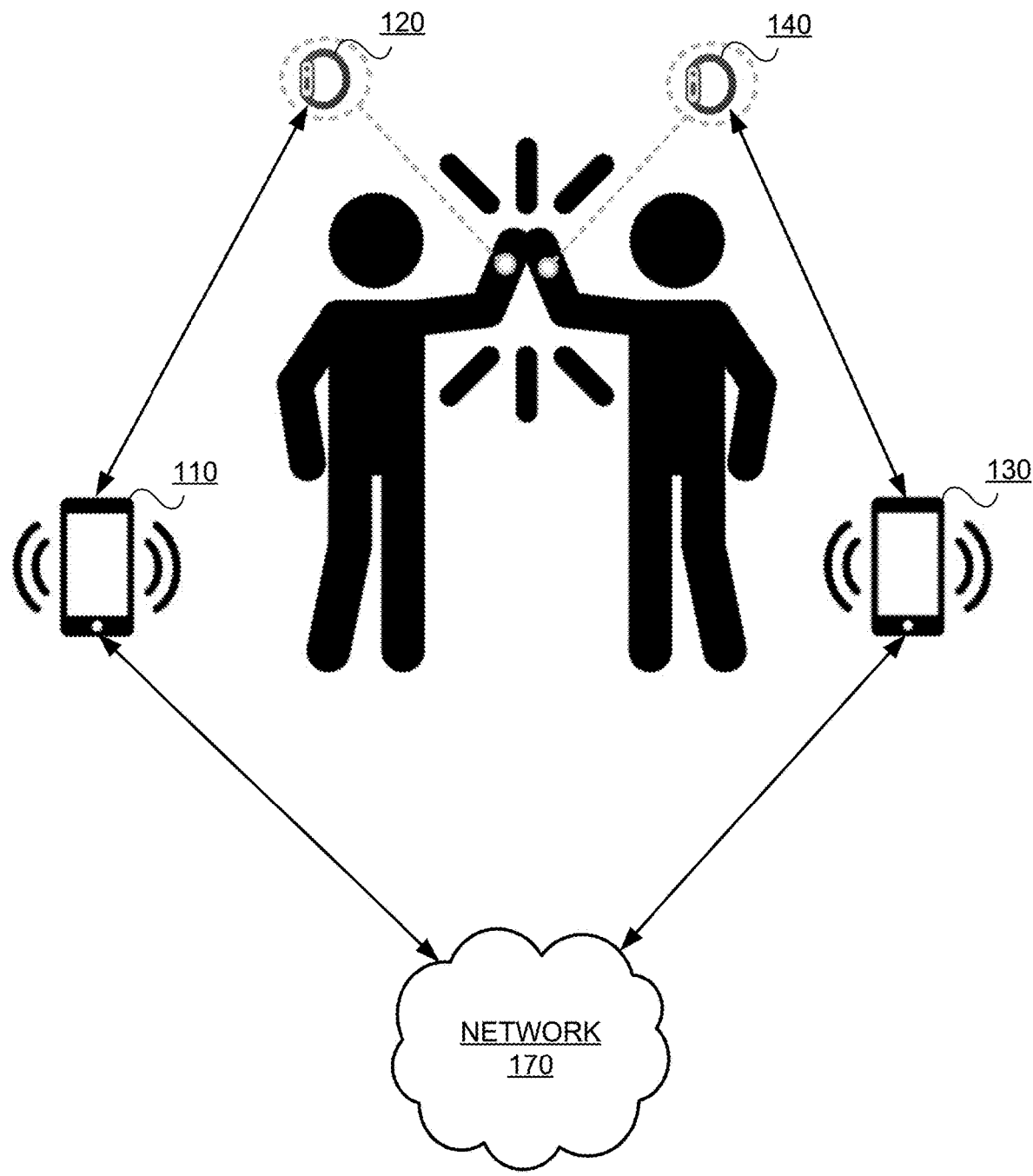
FIG. 4A is a diagram of an exemplary system that may be used facilitate a financial transaction in response to detecting and translating a "high-five" gesture.
Figure 4B:
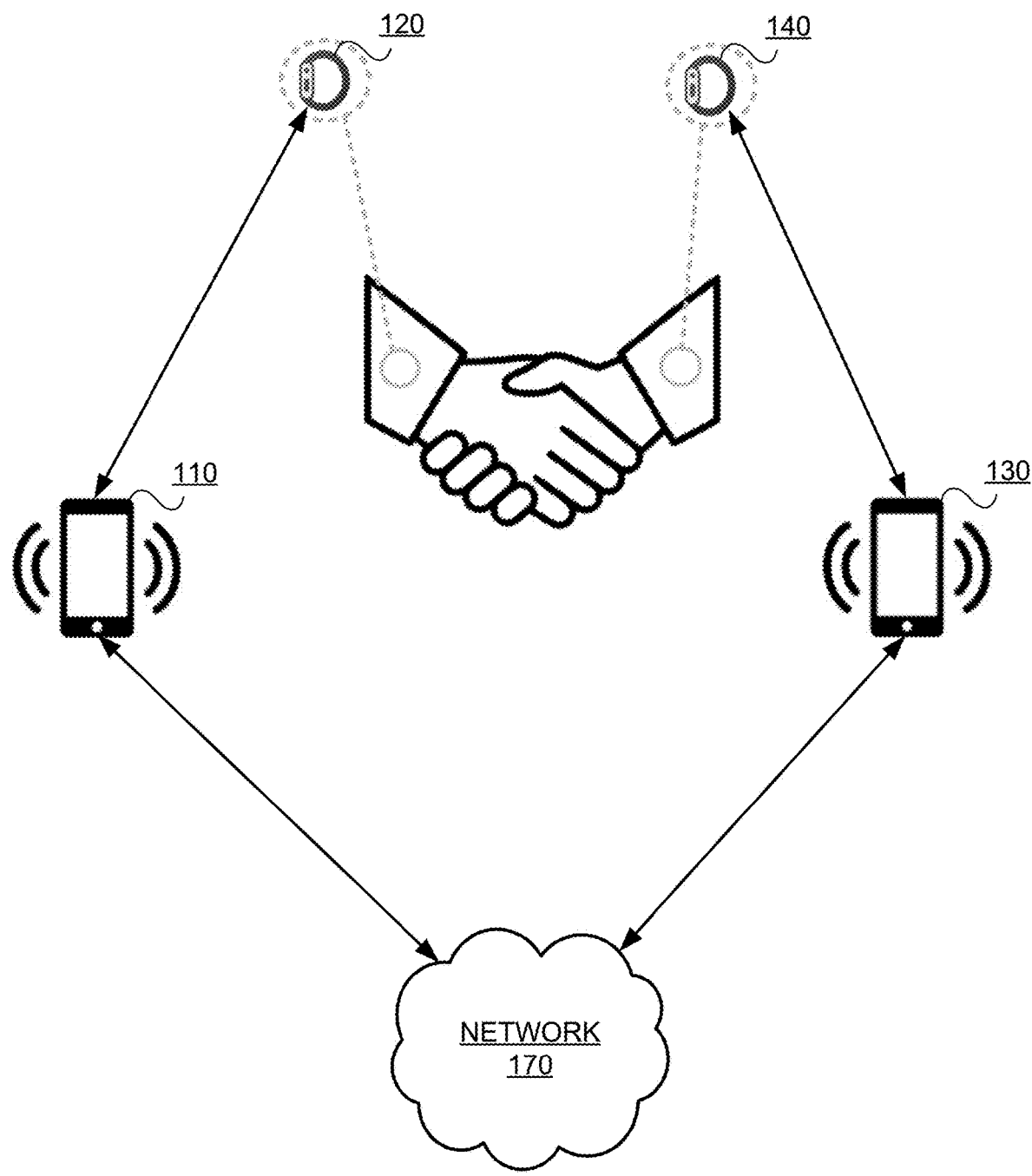
FIG. 4B is a diagram of an exemplary system that may be used facilitate a financial transaction in response to detecting and translating a handshake.

In some embodiments, program(s) 336 may be configured to determine whether received payee gesture data complements detected payor gesture. For example, program(s) 336 may be configured to determine that the received payee gesture data and the detected payor gesture correspond to a "high-five" gesture such as is depicted in FIG. 4A, a handshake such as is depicted in FIG. 4B, or some other predetermined complementary gesture, such as a "secret handshake" that is known only to a user of payor transaction device 120 and a user of payee transaction device 140. In some embodiments, program(s) 336 may be configured to verify that a predetermined complementary gesture is within a predetermined confidence level threshold. For example, in the case of a high-five, program(s) 336 may be configured to determine that there is at least a predetermined confidence threshold that the received payee gesture data mirrors the detected payor gesture. As another example, in the case of a handshake, program(s) 336 may be configured to determine that there is at least a predetermined confidence threshold that the received payee gesture data corresponds to the same motion as the detected payor gesture. In some embodiments, spatial gesture data detected by payor transaction device 120 and payee transaction device 140 may comprise a time stamp. In some embodiments, program(s) 336 may be configured to determine that a received payee gesture data occurred at substantially the same time as a detected payor gesture. In some embodiments, program(s) 336 may be configured to determine that there is at least a predetermined confidence threshold that a received payee gesture data occurred at substantially the same time as a detected payor gesture.

In some embodiments, program(s) may be configured to require a payment-acceptance spatial gesture from payee transaction device 140, which may be performed and detected by payee transaction device 140 in conjunction with a gesture performed and detected by payor transaction device 120 (e.g., a handshake or high-five, as discussed above) or which may be performed and detected by payee transaction device 140 independently of a gesture performed and detected by payor transaction device 120. In certain embodiments, payor transaction device 120 may be configured to notify a user if received payee gesture data does adequately complement the detected payor gesture or if payor transaction device 120 has received data indicative of a payment-acceptance spatial gesture detected by payee transaction device 140 and received by payor transaction device 120 from payee transaction device 140.

According to certain embodiments, payor transaction device 120 may be configured to notify a user if received payee gesture data does not adequately complement detected payor gesture (e.g., the received payee gesture data and detected payor gesture are not within a predetermined confidence level of similarity) and, in some embodiments, may be configured to request a second attempt at performing the corresponding gesture(s). In some embodiments, payor transaction device 120 may be configured to notify a user if received payee gesture data does adequately complement detected payor gesture. In certain embodiments, payor transaction device 120 may be configured to notify a user by emitting a sound with a speaker of payor transaction device 120 (e.g., a beep, chime, natural language request, etc.); by emitting light from, for example, an LED of payor transaction device 120; or by displaying a textual or graphic request for authentication on a display of payor transaction device 120. In some embodiments, payor transaction device 120 may be configured to transmit data indicative of adequate gesture data (e.g., the received payee gesture data and detected payor gesture are within a predetermined confidence level of similarity) or inadequate gesture data (e.g., the received payee gesture data and detected payor gesture are not within a predetermined confidence level of similarity) to payor computing device 110, payee computing device 130, and/or payee transaction device 140, such that the corresponding device may notify a user.

In some embodiments, memory 330 may include payor account information data corresponding to a payor financial account associated with the payor transaction device. In some embodiments, program(s) 336 may be configured to transmit, via communication interface 340, transaction data, which may include some or all of gesture data (e.g., initiate-payment gesture data, authentication gesture data, etc.), payor account information data, payee account information data, transaction amount data, authentication data, etc.

According to certain embodiments, payor computing device 110 may be configured to communicate with financial service provider terminal 160 and/or financial service provider server 180. In some embodiments, program(s) 336 of payor transaction device 120 may be configured to detect and translate a withdraw spatial command corresponding to a request to withdraw cash from financial service provider terminal 160. In some embodiments, program(s) 336 may be configured to transmit, to financial service provider terminal 160 and/or financial service provider server 180, a request to withdraw cash. In some embodiments, program(s) 336 may be configured to transmit, to financial service provider terminal 160 and/or financial service provider server 180, authentication data, which may comprise iris recognition data, retinal scan data, facial recognition data, voice biometric data, other biometric data, password data, passcode data, PIN data, authentication gesture data, geographic location data, and/or any other appropriate authentication data. Iris recognition data may refer to data corresponding to pattern-recognition of one or both of the irises of a person's eyes, retinal scan data may refer to data indicative of pattern-recognition of the retinal blood vessels in a person's eye, and facial recognition data may refer to data indicative of a person's facial features. Iris recognition data, retinal scan data, and/or facial recognition data may be detected by a camera or another appropriate sensor. Voice biometric data may refer to data indicative of various characteristics of a person's voice and may be detected by a microphone or another appropriate sensor. Other biometric data indicative of characteristics unique to a particular person may be detected by an appropriate sensor. For example, a person's fingerprint may be detected by an area fingerprint sensor, a swipe fingerprint sensor, a camera, or any other applicable sensor. Password data, passcode data, and PIN data may refer to various types of secret data known only to a particular person. Authentication gesture data may refer to data indicative of a spatial gesture that is secret information known to a particular person and may be detected by a device having a motion-detecting device (e.g., an accelerometer and/or gyroscope), such as payor transaction device 120 or payee transaction device 140. Geographic location data may refer to data indicative of the location of a person and/or device, such as payor computing device 110, payor transaction device 120, payee computing device 130, and/or payee transaction device 140. Geographic location data may be detected by, for example, a GLS.

According to some embodiments, payee transaction device 140 may be configured to detect an authenticating gesture and transmit authentication gesture data indicative of the authenticating gesture to serve as an additional layer of security in addition to, for example, traditional authentication methods, such entry of a password, passcode, PIN, or biometric data. In some embodiments, payee transaction device 140 may be configured to transmit the authentication gesture data directly to merchant POS terminal 150, financial service provider terminal 160, financial service provider server 180, or any other recipient to enable the recipient to authenticate a transaction.

Merchant POS terminal 150 may have one or more processors and one or more merchant databases, which may be any suitable repository of merchant data, which may include data associated with or identifying the merchant of a financial account associated with the merchant. Merchant databases may be located at the POS location, off-site at another merchant location, or at a third-party location. In some embodiments, merchant POS terminal 150 may include a sensor and/or a communication interface for detecting and/or receiving transaction data from payor computing device 110, payor transaction device 120, second payor computing device (i.e., payee computing device 130) and/or second payor transaction device (i.e., payee transaction device 140). In some embodiments, the transaction data may include initiate-payment gesture data corresponding to a command to initiate payment, financial account data indicative of a financial account associated with the respective device, authorization data, and/or transaction amount data. In some embodiments, merchant POS terminal 150 may be configured to transmit, to a financial service provider, at least some of the transaction data, alone or in conjunction with at least some of the merchant data.

According to some embodiments, financial service provider terminal 160 may include memory that includes instructions that, when executed by a processor of financial service provider terminal 160, perform one or more processes consistent with the functionalities disclosed herein. Methods, systems, and articles of manufacture consistent with disclosed embodiments are not limited to separate programs or computers configured to perform dedicated tasks. For example, financial service provider terminal 160 may include memory that may include one or more programs to perform one or more functions of the disclosed embodiments. Moreover, processor may execute one or more programs located remotely. For example, financial service provider terminal 160 may access one or more remote programs, that, when executed, perform functions related to one or more disclosed embodiments. For example, certain programs associated with financial service provider terminal 160 may be performed by financial service provider server 180.

In some embodiments, financial service provider terminal 160 may include a communication interface, which may be configured to receive data from payor computing device 110 and/or payor transaction device 120. In some embodiments, one or more programs of financial service provider terminal 160 may be configured to receive transaction data from payor transaction device 120, where the transaction data may include gesture data indicative of a spatial gesture detected by payor transaction device 120 and corresponding to a transaction command, such as a cash withdrawal command.

In some embodiments, program(s) of financial service provider terminal 160 may be configured to transmit, to payor transaction device 120, a request for first authentication data and may be configured to receive first authentication data from payor transaction device 120, where the first authentication data is indicative of an authenticating spatial gestured detected by payor transaction device. In certain embodiments, program(s) of financial service provider terminal 160 may be configured to receive first authentication data from payor transaction device 120 without transmitting a request for the first authentication data. In some embodiments, program(s) of financial service provider terminal 160 may be configured to transmit, to payor transaction device 120, a request for geographic location data. In some embodiments, program(s) of financial service provider terminal 160 may be configured to transmit, to payor computing device 110, a request for second authentication data and/or geographic location data. In certain embodiments, program(s) of financial service provider terminal 160 may be configured to receive geographic location data from payor transaction device 120, geographic location data from payor computing device 110, and/or second authentication data. In some embodiments, program(s) of financial service provider terminal 160 may be configured to verify that the first authentication data corresponds to saved first authentication data, that the second authentication data corresponds to saved second authentication data, that the geographic location data of the payor computing device 110 corresponds to a geographic location within a predetermined distance of financial service provider terminal 160, and/or that the geographic location data of the payor transaction device 120 corresponds to a geographic location within a predetermined distance of financial service provider terminal 160. One of skill in the art will recognize that the phrase "within a predetermined distance" as used here refers to a predetermined distance less than a capable communication range of a particular device. For example, in some embodiments, the phrase "within a predetermined distance" may refer to a particular device having a geographic location that is 1 foot, 3 feet, 5 feet, 10 feet, 30 feet, or any other desired distance from financial service provider terminal 160.

In some embodiments, financial service provider terminal 160 may be configured to communicate with financial service provider server 180 directly or via an intranet or some other secured network. In some embodiments, financial service provider terminal 160 may be configured to transmit, to financial service provider server 180, at least a portion of the transaction data, the first authentication data, the second authentication data, the geographic location data of the payor computing device 110, and/or the geographic location data of the payor transaction device 120. In some embodiments, this may enable the financial service provider to conduct the transaction corresponding to the spatial gesture detected by payor transaction device 120. In certain embodiments, financial service provider terminal 160 may be configured to receive a command from financial service provider server 180 and may, in some embodiments, perform a physical action, such as outputting cash.

Figure 5:
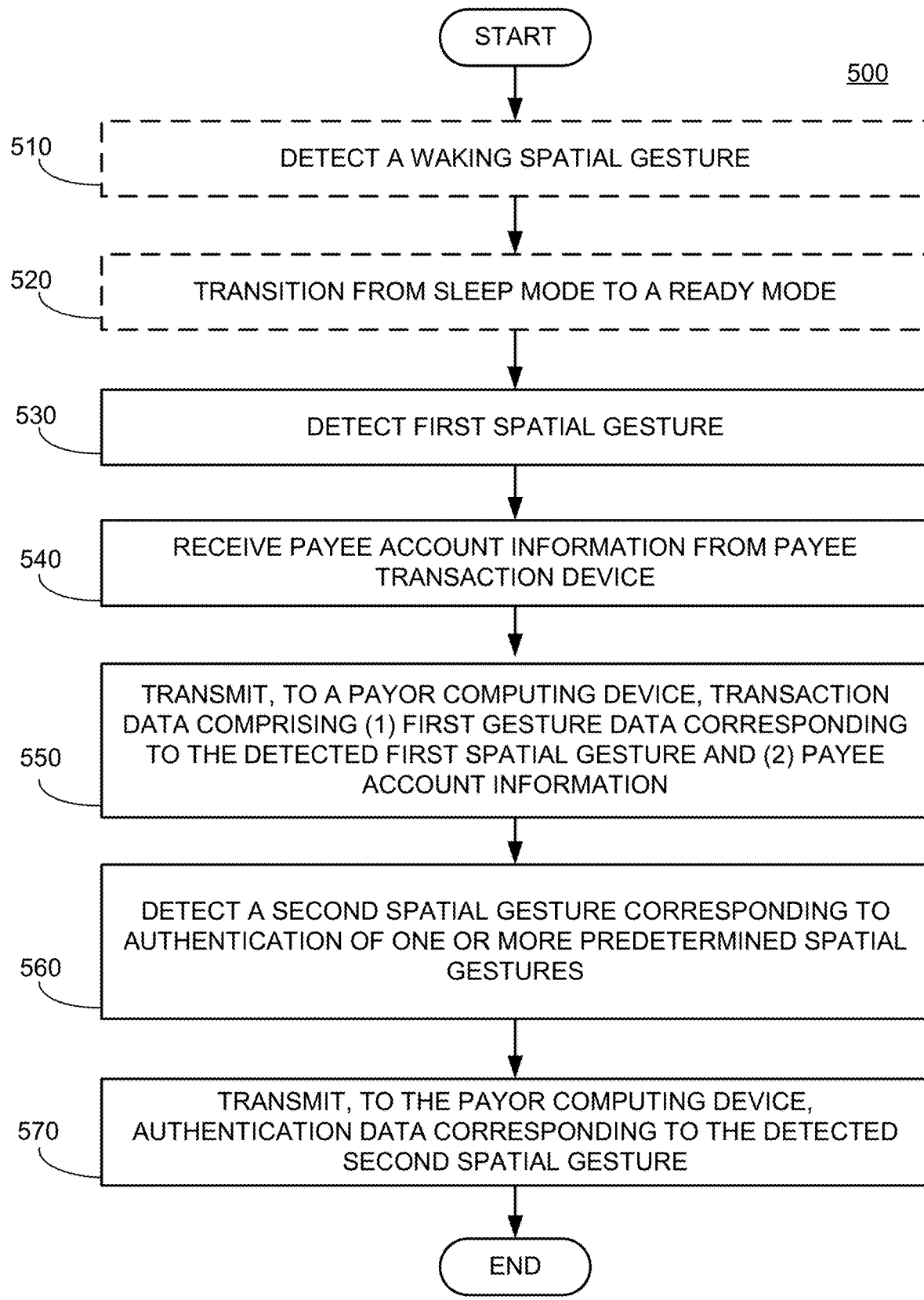
FIG. 5 is a flowchart of an exemplary method for initiating and/or facilitating a financial transaction in response to detecting and translating a spatial gesture.

FIG. 5 shows a flowchart of method 500 for initiating and/or facilitating a financial transaction in response to detecting and translating a spatial gesture. Method 500 may be performed by payor transaction device 120 using processor 310 to execute memory 330. In some embodiments, one or more steps of method 500 may be delegated to other devices or systems discussed herein, such as payor computing device 110, payee computing device 130, payee transaction device 140, merchant POS terminal 150, financial service provider terminal 160, and/or financial service provider server 180. Following method 500, a user may be enabled to conduct a transaction by performing a spatial gesture.

At block 510, payor transaction device 120 may optionally detect a waking spatial gesture. The payor transaction device 120 may recognize or otherwise determine that the detected waking spatial gesture corresponds to saved data indicative of a waking spatial gesture.

At block 520, payor transaction device 120 may transition from sleep mode, in which payor transaction device 120 may be configured to only detect a waking spatial gesture and/or the presence of another transaction device within a predetermined range, to a ready mode, in which payor transaction device 120 may be configured to detect any of one or more predetermined spatial gestures.

At block 530, payor transaction device 120 may detect a first spatial gesture. Payor transaction device 120 may, in some embodiments, translate the first spatial gesture to determine that the first spatial gesture corresponds to an initiate-payment command by, for example, comparing first gesture data indicative of the first spatial gesture to saved initiate-payment gesture data indicative of the initiate-payment command.

At block 540, payor transaction device 120 may receive payee account information from payee transaction device 140. The payee account information may be indicative of a financial account associated with payee transaction device 140. Payor transaction device 120 may be configured to receive the payee account information responsive to detecting or otherwise determining that payee transaction device is within a predetermined distance of payor transaction device 120. In some embodiments, payor transaction device 120 may, prior to receiving the payee account information from payee transaction device 140, transmit a request for the payee account information to payee transaction device 140. In certain embodiments, payee transaction device 140 may transmit the payee account information to payor transaction device 120 responsive to detecting payor transaction device 120 (e.g., determining that payor transaction device is within a predetermined distance or range of payee transaction device 140) or responsive to a detected predetermined spatial gesture.

At block 550, payor transaction device 120 may transmit, to payor computing device 110, transaction data comprising at least some of (1) the payor gesture data corresponding to the detected payor spatial gesture and (2) the payee account information. For embodiments in which payor transaction device 120 is configured to translate spatial gestures, payor transaction device 120 may transmit, to payor computing device 110, transaction data comprising (1) a command corresponding to the detected payor spatial gesture and (2) the payee account information.

At block 560, payor transaction device 120 may detect a second spatial gesture corresponding to authentication of one or more predetermined spatial gestures, such as the initiate-payment gesture. In some embodiments, payor transaction device 120 may verify that the second spatial gesture corresponds to such authentication by, for example, comparing second spatial gesture data indicative of the detected second spatial gesture to saved authentication data indicative of an authentication gesture.

At block 570, payor transaction device 120 may transmit, to payor computing device 110, second spatial gesture data indicative of the detected second spatial gesture. For embodiments in which payor transaction device 120 is configured to verify the second spatial gesture, payor transaction device 120 may transmit, to payor computing device 110, an authentication determination indicative of the authentication verification.

Some embodiments may include one or more steps not included in FIG. 5. For example, in some embodiments, the payee account information may be transmitted directly from payee transaction device 140 to payor transaction device 120. For example, the payee account information may be transmitted, should payee transaction device 140 be within a predetermined distance (that is less than a capable range) from payor transaction device 120. In some embodiments, payor transaction device 120 is configured to emit a field or signal responsive to detecting the first spatial gesture. In certain embodiments, payee transaction device 140 may transmit payee account information to payor transaction device 120 responsive to detecting the field or signal emitted by payor transaction device 120. In certain embodiments, payee transaction device 140 may transmit payee account information and a transaction identifier to financial service provider 180 (e.g., directly or via payee computing device 130) responsive to detecting the field or signal emitted by payor transaction device 120. In some embodiments, payee transaction device 140 may transmit the transaction identifier to payor transaction device 120. In some embodiments, payee transaction device 140 may generate the transaction identifier, and in some embodiments, payor transaction device 120 may generate the transaction identifier and transmit it to payee transaction device 140.

In some embodiments, responsive to payor transaction device 120 detecting the close proximity of payee transaction device 140 (e.g., by determining payee transaction device 140 is within the field or detecting a return signal from payee transaction device 140) and detecting completion of the second spatial gesture, payor transaction device 120 may transmit transaction data and/or gesture data to payee transaction device 140. Payee transaction device 140 may transmit transaction data and/or gesture data to payor transaction device 120. In some embodiments, one or more of payor transaction device 120 and payee transaction device 140 may be configured to validate the transaction data and/or gesture data of both payor transaction device 120 and payee transaction device 140. In some embodiments, one or both of payor transaction device 120 and payee transaction device 140 may be configured to transmit transaction data of one or both of payor transaction device 120 and payee transaction device 140 to financial service provider server 180 (e.g., directly or via payor computing device 110 and/or payee computing device 130) for backend validation.

In some embodiments, payor transaction device 120 may be configured to, responsive to detecting the first spatial gesture, initiate communication with payee transaction device and may transmit transaction data and request payee account information to be sent for validation to financial service provider server 180 (e.g., directly or via payee computing device 130). In some embodiments, financial service provider server 180 may be configured to receive transaction data and payee account information from payee transaction device 140 or payee computing device 130 and may be configured to receive transaction data from payor transaction device 120 or payee computing device 110. In certain embodiments, financial service provider server 180 may be configured to validate the transaction data prior to facilitating the requested transaction.

Figure 6:
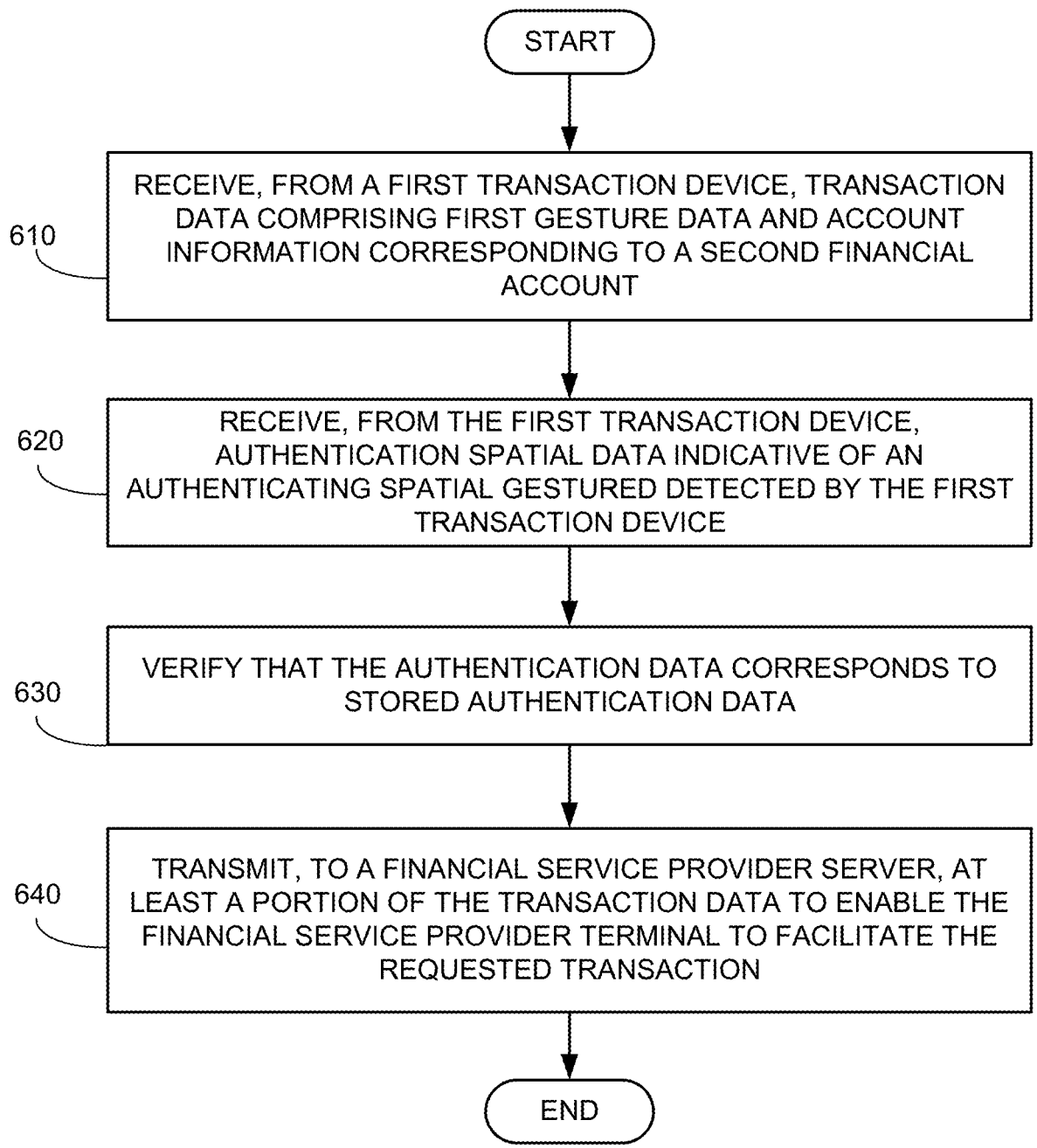
FIG. 6 is a flowchart of another exemplary method for initiating and/or facilitating a financial transaction in response to detecting and translating a spatial gesture.

FIG. 6 shows a flowchart of method 600 for initiating and/or facilitating a financial transaction in response to detecting and translating a spatial gesture. Method 600 may be performed by payor computing device 110 using processor 210 to execute memory 230. In some embodiments, one or more steps of method 500 may be delegated to other devices or systems discussed herein, such as payor computing device 110, payee computing device 130, payee transaction device 140, merchant POS terminal 150, financial service provider terminal 160, and/or financial service provider server 180. Following method 600, a user may be enabled to conduct a transaction by performing a spatial gesture.

At block 610, payor computing device 110 may receive, from a first transaction device (e.g., payor transaction device 120), transaction data comprising first gesture data and account information corresponding to a financial account associated with a second transaction device (e.g., payee transaction device 140).

At block 620, payor computing device 110 may receive, from the first transaction device, authentication spatial data indicative of an authenticating spatial gesture detected by the first transaction device. In some embodiments, payor computing device 110 may receive, from the first transaction device, an authentication determination indicative of an authentication verification performed by the first transaction device.

At block 630, payor computing device 110 may verify that the authentication data corresponds to stored authentication data. In embodiments in which the first transaction device performs verification, the step of block 630 is not necessary.

At block 640, payor computing device 110 may transmit, to financial service provider terminal 160, at least a portion of the transaction data to enable the financial service provider terminal to facilitate the requested transaction.

Figure 7:
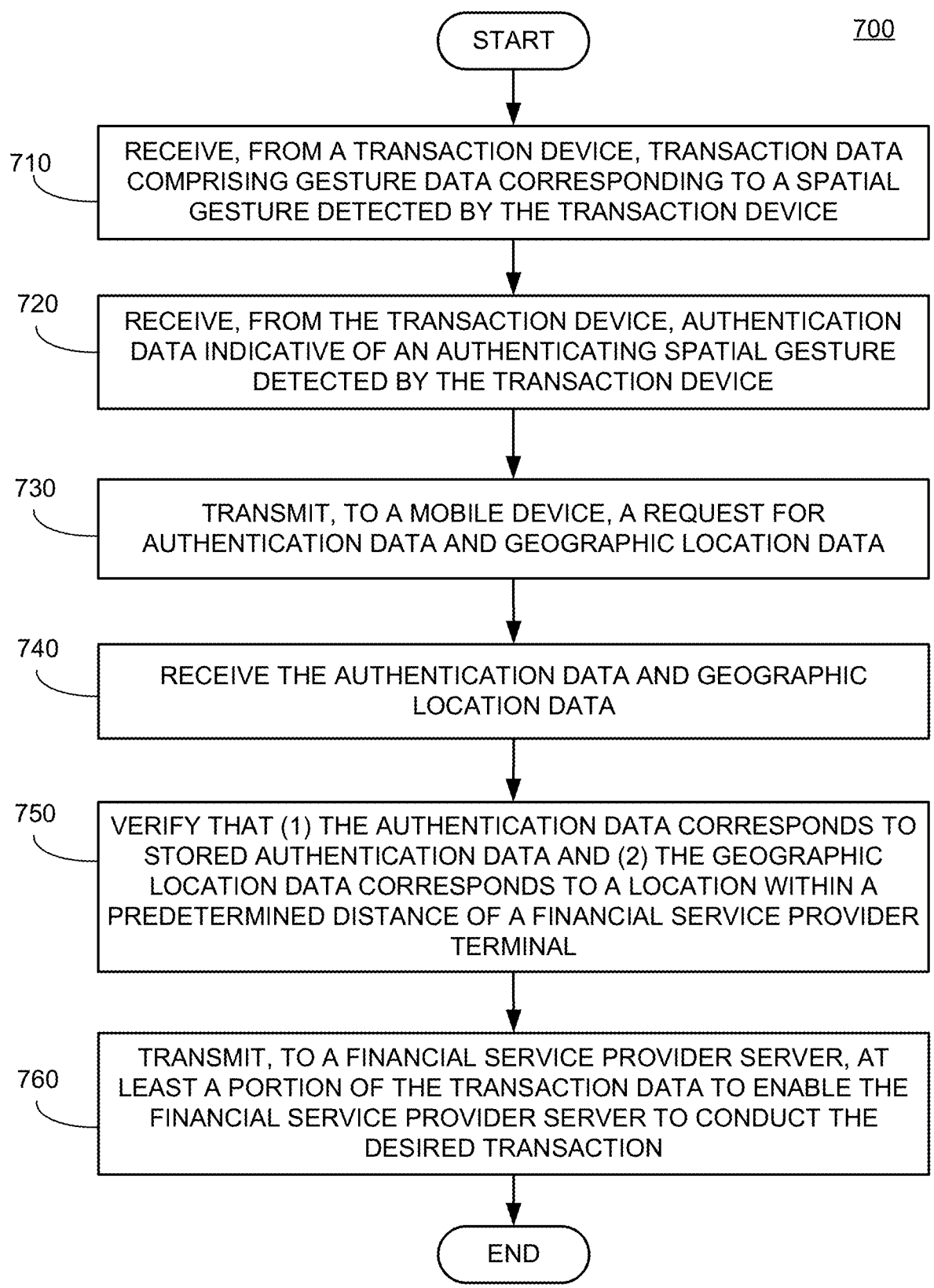
FIG. 7 is a flowchart of another exemplary method for initiating and/or facilitating a financial transaction in response to detecting and translating a spatial gesture.

FIG. 7 shows a flowchart of method 700 for initiating and/or facilitating a financial transaction in response to detecting and translating a spatial gesture. Method 700 may be performed by financial service provider terminal 160 using a processor to execute instructions stored on memory. In some embodiments, one or more steps of method 700 may be delegated to other devices or systems, such as service provider terminal 110, computing device 120, merchant database terminal 140, financial service provider terminal 160, and/or financial service provider server 180. Following method 600, a user associated with computing device 120 may be enabled to purchase one or more items or services at a merchant location by following a sequence of predetermined augmented reality modes designed to facilitate the process of making the purchase.

At block 710, financial service provider terminal 160 may receive, from a transaction device (e.g., payor transaction device 120), transaction data comprising gesture data corresponding to a spatial gesture detected by the transaction device.

At block 720, financial service provider terminal 160 may receive, from the transaction device, authentication data indicative of an authenticating spatial gesture detected by the transaction device.

At block 730, financial service provider terminal 160 may transmit, to a mobile device, a request for authentication data and geographic location data.

At block 740, financial service provider terminal 160 may receive authentication data and geographic location data. In some embodiments, the authentication data may be indicative of an authenticating spatial gesture detect by the transaction device. In some embodiments, the geographic location data may be indicative of a geographic location of the mobile device. In some embodiments, the geographic location data may be indicative of a geographic location of the transaction device.

At block 750, financial service provider terminal 160 may verify that (1) the authentication data corresponds to stored authentication data and (2) the geographic location data corresponds to a location within a predetermined distance of financial service provider terminal 160.

At block 760, financial service provider terminal 160 may transmit, to a financial service provider server, at least a portion of the transaction data to enable the financial service provider server to conduct the desired transaction.

Some or all of the steps performed by financial service provider terminal 160 may be performed by financial service provider server 180, which may employ processor 182 and memory 184.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. It is intended solely for explanatory purposes and not in limitation. A user may be equipped with a mobile device (e.g., payor computing device 110) and a smart wearable device (e.g., payor transaction device 120). The smart wearable device is worn by the user on or near a hand. The smart wearable device may be configured to be in sleep mode while not in use to save power. To transition the smart wearable device to ready mode, the user performs a waking spatial gesture, which the smart wearable device detects, determines that the detected waking spatial gesture corresponds to stored waking gesture data that is stored on memory of the smart wearable device, and transitions to ready mode.

While in ready mode, the smart wearable device is configured to detect one or more spatial gestures. To conduct a peer-to-peer transaction, the user (who, in this example, is the payor) approaches a second user (who, in this example, is the payee) who is equipped with a mobile device (e.g., payee computing device 130) and a smart wearable device (e.g., a payee transaction device 140). The payee's smart wearable device transitions to ready mode either by detecting a waking gesture performed by the payee or by detecting that the payor's smart wearable device is within a predetermined distance of the payee's smart wearable device. The payor and the payee perform a complementary gesture in unison. For example, the payor and the payee may shake hands to conduct a transaction. Both the payor's smart wearable device and the payee's smart wearable device detect the gesture and convert the detected gesture to payor gesture data and payee gesture data, respectively. The payee's smart wearable device transmits, to the payor's smart wearable device, the payee gesture data and payee account information data that is indicative of a financial account associated with the payee's smart wearable device. The payor's smart wearable device emits an audible request for a transaction amount. The user provides a verbal indication of transaction amount, which the payor's smart wearable device records and saves as transaction amount data. The payor's smart wearable device transmits, to the payor's mobile device, transaction data, which includes the payor gesture data, the payee gesture data, the transaction amount data, and the payee account information data.

The payor's mobile device receives the transaction data and determines that the payor gesture data and the payee gesture data are within a predetermined level of confidence of similarity. The payor's mobile device also determines that the payor gesture data corresponds to saved initiate-payment gesture data stored in memory of the payor's mobile device, indicating that a transaction command has been issued. The payor's mobile device also determines the transaction amount from the transaction amount data. The payor's mobile device transmits a request for authentication information to the payor's smart wearable device. The payor's smart wearable device receives the request for authentication and emits an audible request for authentication. The user performs an authenticating gesture, which is detected by the payor's smart wearable device. The payor's smart wearable device transmits, to the payor's mobile device, authentication data that is indicative of the detected authenticating gesture. The payor's mobile device receives the authentication data and determines that the authentication data corresponds to saved authentication data stored in memory of the payor's mobile device. The payor's mobile device then transmits, to a financial service provider server, the transaction amount data and the payee account information data to enable the financial service provider server to conduct the transaction.

In an alternate embodiment, after the user and the second user perform a complementary gesture in or nearly in unison, both the payor's smart wearable device and the payee's smart wearable device detect the gesture and convert the detected gesture to payor gesture data and payee gesture data, respectively. The payor's smart wearable device generates a unique transaction identifier and transmits the transaction identifier to the payee's smart wearable device.

The payor's smart wearable device transmits, to the payee's smart wearable device, a transaction identifier, the payor gesture data, and payor account information data that is indicative of a financial account associated with the payor's smart wearable device, and the payee's smart wearable device 140 transmits, to the payee's mobile device, a transaction identifier, the payee gesture data, and payee account information data that is indicative of a financial account associated with the payee's smart wearable device. The payor's smart wearable device emits an audible request for a transaction amount. The user provides a verbal indication of transaction amount, which the payor's smart wearable device records and saves as transaction amount data. The payor's smart wearable device emits an audible request for authentication. The user performs an authenticating gesture, which is detected by the payor's smart wearable device, and the payor's smart wearable device transmits, to the payor's mobile device, authentication data that is indicative of the detected authenticating gesture. The payor's mobile device transmits, to a financial service provider server (e.g., financial service provider server 180) and via a network (e.g., network 170), the payor account information data, the payor gesture data, the transaction identifier, the transaction amount data, and the authentication data, and the payee's mobile device transmits, to the financial service provider server and via a network, the transaction identifier, the payee account information data, the payor gesture data. In another alternate embodiment, the payor's smart wearable device transmits, to a financial service provider server and via a network, the payor account information data, the payor gesture data, the transaction identifier, the transaction amount data, the authentication data, payee account information data, and the payor gesture data. In another alternate embodiment, the payor's smart wearable device transmits, to a financial service provider server and via a network, the payor account information data, the payor gesture data, the transaction identifier, the transaction amount data, and the authentication data, and the payee's smart wearable device transmits, to the financial service provider server and via a network, the transaction identifier, the payee account information data, the payor gesture data. In some embodiments, the various gestures described above as being detected by a payor's smart wearable device and/or a payee's smart wearable device are detected by a payor's mobile device and/or a payee's mobile device.

The financial service provider server determines a transaction amount from the transaction amount data by, for example, using voice recognition technology. The financial service provider server also matches the transaction identifier received from the payor's mobile device and the payee's mobile device, and the financial service provider server also determines that the payor gesture data and the payee gesture data are within a predetermined level of confidence of similarity, that the payor gesture data corresponds to saved initiate-payment gesture data stored in memory of the financial service provider server, and that the authentication data corresponds to saved authentication data stored in memory of the financial service provider server. The financial service provider server then completes the requested transaction and transmits confirmation of the completed transaction to the payor's mobile device and the payee's mobile device.

Another exemplary use case relates to the situation in which a user has an intent to purchase an item at a merchant POS terminal (e.g., merchant POS terminal 150). The payor's 's smart wearable device transitions from sleep mode to ready mode either by detecting that the payor's smart wearable device is within a predetermined distance of the merchant POS terminal or by detecting a waking spatial gesture performed by the user and determining that the detected waking spatial gesture corresponds to stored waking gesture data that is stored on memory of the payor's smart wearable device. The user performs a spatial transaction gesture, and the payor's smart wearable device detects the spatial transaction gesture and converts the detected transaction gesture to detected gesture data. The payor's smart wearable device determines that the detected gesture corresponds to an initiate-payment command by determining that the detected gesture data is above a predetermined confidence threshold of similarity to saved initiate-payment gesture data stored in memory of the payor's smart wearable device. The payor's smart wearable device transmits account information data, which is saved on memory and is indicative of a financial account associated with the payor's smart wearable device, and an initiate-payment command to the merchant POS terminal, and the merchant POS terminal transmits a request for authentication information to the payor's smart wearable device. The payor's smart wearable device receives the request for authentication and emits an audible request for authentication. The user performs an authenticating gesture, which is detected by the payor's smart wearable device. The payor's smart wearable device transmits, to the merchant POS terminal, authentication data that is indicative of the detected authenticating gesture. The merchant POS terminal receives the authentication data and transmits, to a financial service provider server (e.g., financial service provider server 180), purchase data including a purchase amount, the account information data, and the authentication data. The financial service provider server determines that the authentication data corresponds to saved authentication data stored in memory of the financial service provider server. The financial service provider server then transmits, to the merchant POS terminal, an indication that the transaction has been conducted to enable the merchant POS terminal to complete the sale.

Another exemplary use case relates to the situation in which a user has an intent to withdraw cash from a financial service provider terminal (e.g., financial service provider terminal 160). The payor's smart wearable device transitions from sleep mode to ready mode either by detecting that the payor's smart wearable device is within a predetermined distance of the financial service provider terminal or by detecting a waking spatial gesture performed by the user and determining that the detected waking spatial gesture corresponds to stored waking gesture data that is stored on memory of the payor's smart wearable device. The user performs a spatial transaction gesture, and the payor's smart wearable device detects the spatial transaction gesture and converts the detected transaction gesture to detected gesture data. the payor's smart wearable device determines that the detected gesture corresponds to a cash withdrawal command by determining that the detected gesture data is above a predetermined confidence threshold of similarity to saved cash withdrawal data stored in memory of the payor's smart wearable device. the payor's smart wearable device emits an audible request for a withdrawal amount. The user provides a verbal indication of the withdrawal amount, which the payor's smart wearable device records and saves as withdrawal amount data. the payor's smart wearable device transmits account information data, which is saved on memory and is indicative of a financial account associated with the payor's smart wearable device, the cash withdrawal command, and the withdrawal amount data to the financial service provider terminal, and the financial service provider terminal transmits a request for authentication information to the payor's smart wearable device. the payor's smart wearable device receives the request for authentication and emits an audible request for authentication. The user performs an authenticating gesture, which is detected by the payor's smart wearable device. the payor's smart wearable device transmits, to the financial service provider terminal, authentication data that is indicative of the detected authenticating gesture. The financial service provider terminal receives the authentication data and transmits, to a financial service provider server, withdrawal data including the account information data, the withdrawal command, the withdrawal amount data, and the authentication data. The financial service provider server determines that the authentication data corresponds to saved authentication data stored in memory of the financial service provider server and that the financial account associated with the account information data has a balance greater than or equal to the withdrawal amount corresponding to the withdrawal amount data. The financial service provider server then transmits, to the financial service provider terminal, an indication that the withdrawal is approved, and the financial service provider terminal outputs the requested amount of cash.

The invention claimed is:

1. A payor transaction device for conducting gesture-based transactions using an associated payor financial account, the payor transaction device comprising:
    a processor;
    a motion-detecting device;
    a signal sensor;
    a communication interface; and
    a memory coupled to the processor and storing instructions that, when executed by the processor, cause the payor transaction device to:
        while in a sleep mode:
            detect, via the motion-detecting device, a waking spatial gesture;

detect, with the signal sensor, a proximity signal transmitted from a payee transaction device;

determine, by the processor and based on a signal strength of the proximity signal, that a payee transaction device is within a predetermined proximity of the payor transaction device;

wherein the sleep mode is configured for only detecting the waking spatial gesture and detecting the proximity signal transmitted from the payee transaction device;

responsive to detecting the waking spatial gesture and determining that the payee transaction device is within the predetermined proximity of the payor transaction device, transition from a sleep mode to a ready mode configured for detecting one or more predetermined spatial gestures within a predetermined time threshold;

when none of the one or more predetermined spatial gestures are detected within the predetermined time threshold, return to the sleep mode;

when a first payor spatial gesture of the one or more predetermined spatial gestures is detected within the predetermined time threshold:

initiate a transfer of funds from the payor financial account to a payee financial account in response to detecting the first payor spatial gesture, wherein the first payer spatial gesture corresponds to an initiate-payment gesture of the one or more predetermined spatial gestures;

generate a first transaction identifier associated with the transfer of funds in response to detecting the first payor spatial gesture;

transmit the first transaction identifier to the payee transaction device;

detect, with the motion-detecting device, a second payor spatial gesture of the one or more predetermined spatial gestures, wherein the second payer spatial gesture corresponds to a conduct-payment gesture of the one or more predetermined spatial gestures, the conduct-payment gesture indicative of a request to conduct the transfer of funds to the payee financial account associated with the payee transaction device in response to determining that the payee transaction device is within the predetermined proximity of the payor transaction device;

receive, at the communication interface and from the payee transaction device, payee account information data corresponding to the payee financial account, in response to detecting the second payor spatial gesture; and transmit, with the communication interface, transaction data and the first transaction identifier to a payor computing device associated with the payor transaction device, the transaction data comprising the payee account information data and payor gesture data corresponding to the first payor spatial gesture, wherein the payor computing device is enabled to transmit at least a portion of the transaction data and the first transaction identifier to a financial service provider server.

2. The payor transaction device of claim 1, wherein the instructions, when executed by the processor, further cause the payor transaction device to:

detect, with the motion-detecting device, a third payor spatial gesture corresponding to an authentication gesture of the one or more predetermined spatial gestures, the authentication gesture being pre-selected by a paying user associated with the payor transaction device; and transmit, with the communication interface and to the payor computing device, authentication data corresponding to the third payor spatial gesture.

3. The payor transaction device of claim 1, wherein the instructions, when executed by the processor, further cause the payor transaction device to:

receive, at the communication interface and from the payee transaction device, payee gesture data indicative of a first payee spatial gesture detected by the payee transaction device, the first payee spatial gesture corresponding to a payment-acceptance gesture of the one or more predetermined spatial gestures.

4. The payor transaction device of claim 3, wherein the instructions, when executed by the processor, further cause the payor transaction device to:

withhold transmission of the transaction data until it is determined that the first payee spatial gesture complements the second payor spatial gesture; and determine that the first payee spatial gesture complements the second payor spatial gesture.

5. The payor transaction device of claim 4, wherein determining that the first payee spatial gesture complements the second payor spatial gesture further comprises determining that either the first payee spatial gesture and the second payor spatial gesture are identical within a first predetermined confidence level threshold or the first payee spatial gesture and the second payor spatial gesture are mirror images within a second predetermined confidence level threshold.

6. The payor transaction device of claim 5 further comprising a geographic location sensor ("GLS"), wherein the instructions, when executed by the processor, further cause the payor transaction device to:

obtain, with the GLS, a payor location of the payor transaction device when the second payor spatial gesture is detected; and receive, at the communication interface and from the payee transaction device, a payee location of the payee transaction device associated with the first payee spatial gesture, wherein determining that the first payee spatial gesture complements the second payor spatial gesture further comprises determining that the payee location is within a predetermined distance of the payor location, the predetermined distance being less than a range of the communication interface.

7. The payor transaction device of claim 6, wherein the predetermined distance is less than ten feet.

8. The payor transaction device of claim 1, further comprising a wearable body housing the processor, the motion-detecting device, the communication interface, and the memory, the wearable body being configured to be worn on one or more of a human finger, hand, wrist, arm, toe, foot, and ankle.

9. The payor transaction device of claim 1, wherein the instructions, when executed by the processor, further cause the payor transaction device to emit a field, in response to detecting the first payor spatial gesture.

10. The payor transaction device of claim 1, wherein the instructions, when executed by the processor, further cause the payor transaction device to transmit the payor gesture data to the payee transaction device, in response to detecting the second payor spatial gesture.

11. The payor transaction device of claim 1, wherein the instructions, when executed by the processor, further cause the payor transaction device to transmit the transaction data to the payee transaction device in response to detecting the second payor spatial gesture.

12. A method, comprising:
while in a sleep mode:
detecting, by a payor transaction device, a waking spatial gesture via a motion-detecting device of the payor transaction device;
detecting, by the payor transaction device, a proximity signal transmitted from a payee transaction device with a signal sensor of the payor transaction device;
determining, by the payor transaction device and based on a signal strength of the proximity signal, that the payee transaction device is within a predetermined proximity of the payor transaction device;
wherein the sleep mode is configured for detecting the waking spatial gesture and detecting the proximity signal transmitted from the payee transaction device;
responsive to detecting the waking spatial gesture and determining that the payee transaction device is within the predetermined proximity of the payor transaction device, transitioning, by the payor transaction device, the payor transaction device from a sleep mode to a ready mode configured for detecting one or more predetermined spatial gestures within a predetermined time threshold;
when none of the one or more predetermined spatial gestures are detected within the predetermined time threshold, returning, by the payor transaction device, to sleep mode;
when a first payor spatial gesture of the one or more predetermined spatial gestures is detected by the payor transaction device within the predetermined time threshold:
initiating, by the payor transaction device, a transfer of funds from the payor financial account to a payee financial account in response to detecting the first payor spatial gesture, wherein the first payor spatial gesture corresponds to an initiate-payment gesture of the one or more predetermined spatial gestures;
generating, by the payor transaction device, a first transaction identifier associated with the transfer of funds in response to detecting the first payor spatial gesture;
detecting, by the payor transaction device, a proximity signal transmitted from a payee transaction device with a signal sensor of the payor transaction device;
determining, by the payor transaction device and based on a signal strength of the proximity signal, that the payee transaction device is within a predetermined proximity of the payor transaction device;
transmitting, by the payor transaction device, the first transaction identifier to the payee transaction device;
detecting, by the payor transaction device, a second payor spatial gesture of the one or more predetermined spatial gestures with the motion-detecting device of the payor transaction device, wherein the second payer spatial gesture corresponds to a conduct-payment gesture of the one or more predetermined spatial gestures, the conduct-payment gesture indicative of a request to conduct the transfer of funds to the payee financial account associated with the payee transaction device in response to determining that the payee transaction device is within the predetermined proximity of the payor transaction device;
receiving, by the payor transaction device at a communication interface of the payor transaction device and from the payee transaction device, payee account information data corresponding to the payee financial account, in response to detecting the second payor spatial gesture; and
transmitting, by the payor transaction device with the communication interface of the payor transaction device, transaction data and the first transaction identifier to a payor computing device associated with the payor transaction device, the transaction data comprising the payee account information data and payor gesture data corresponding to the first payor spatial gesture, wherein the payor computing device is enabled to transmit at least a portion of the transaction data and the first transaction identifier to a financial service provider server.

13. The method of claim 12, further comprising:
detecting, by the payor transaction device, a third payor spatial gesture corresponding to an authentication gesture of the one or more predetermined spatial gestures, the authentication gesture being pre-selected by a paying user associated with the payor transaction device; and
transmitting, with the communication interface and to the payor computing device, authentication data corresponding to the third payor spatial gesture.

14. The method of claim 12, further comprising:
receiving, by the payor transaction device and from the payee transaction device, payee gesture data indicative of a first payee spatial gesture detected by the payee transaction device, the first payee spatial gesture corresponding to a payment-acceptance gesture of the one or more predetermined spatial gestures.

* * * * *